G. J. OLSEN AND F. WATERFIELD.
PIPE MAKING MACHINE.
APPLICATION FILED MAR. 1, 1920.
1,384,021.
Patented July 5, 1921.
6 SHEETS—SHEET 1.
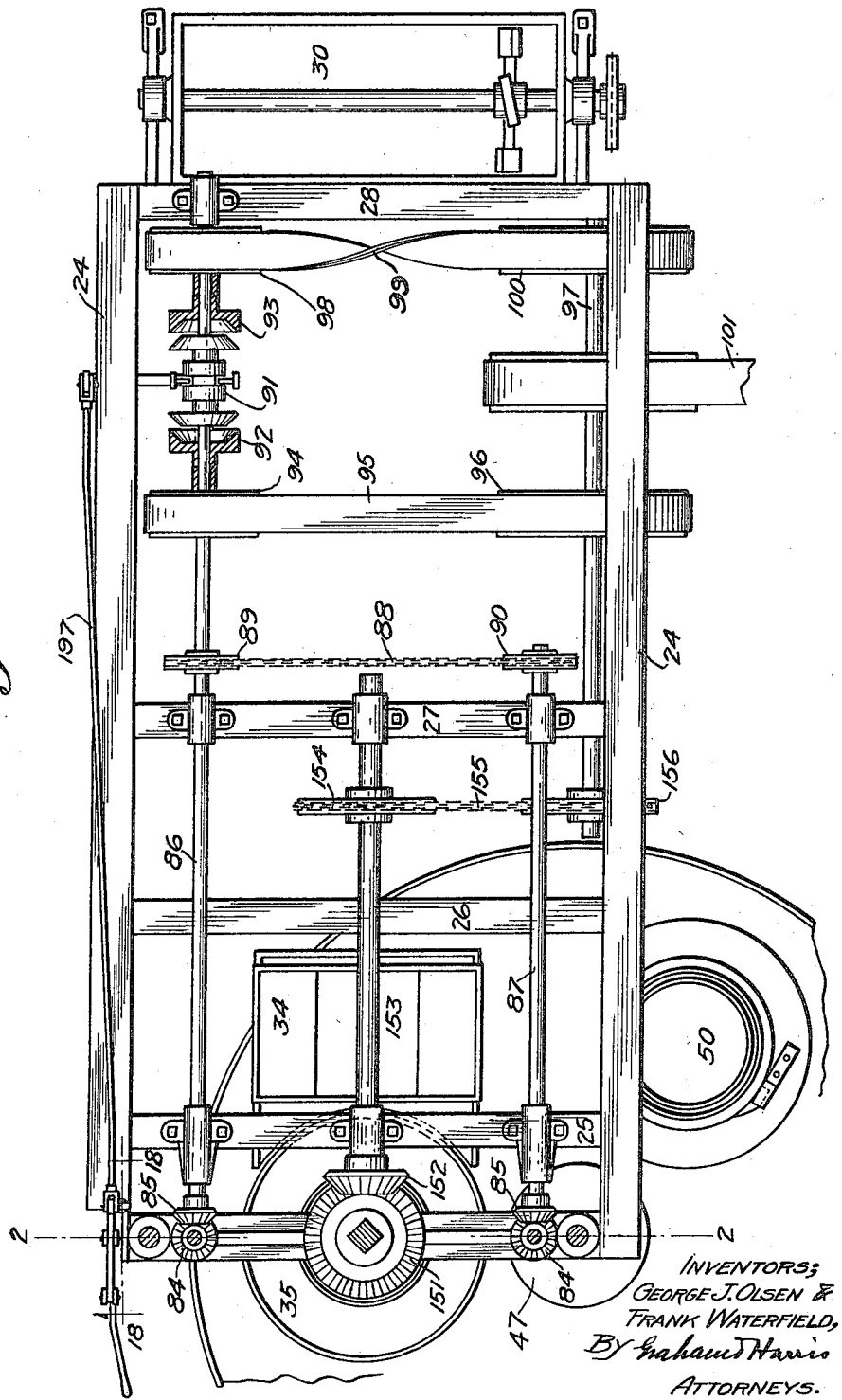
INVENTORS;
GEORGE J. OLSEN &
FRANK WATERFIELD,
By Graham & Harris
ATTORNEYS.

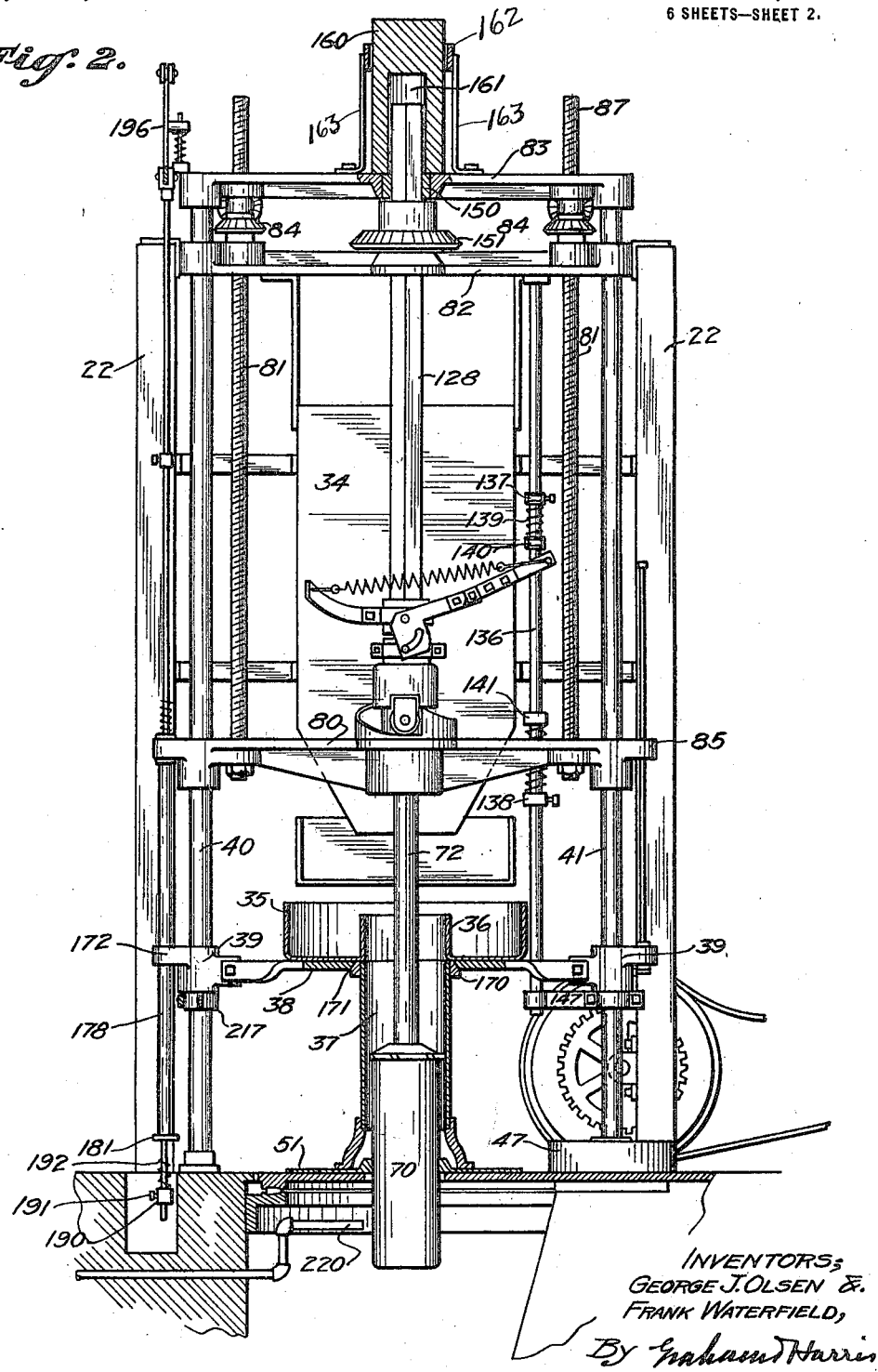

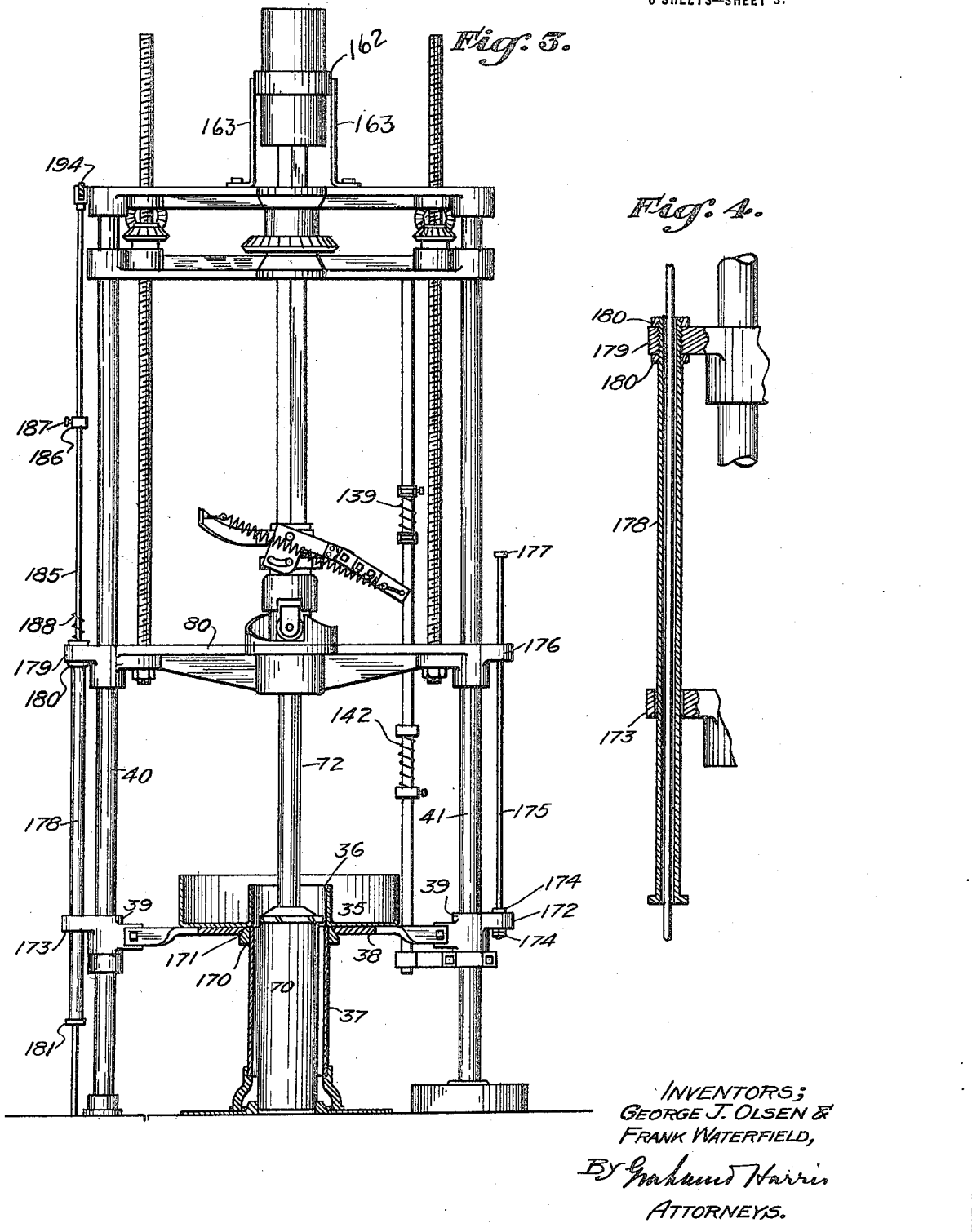

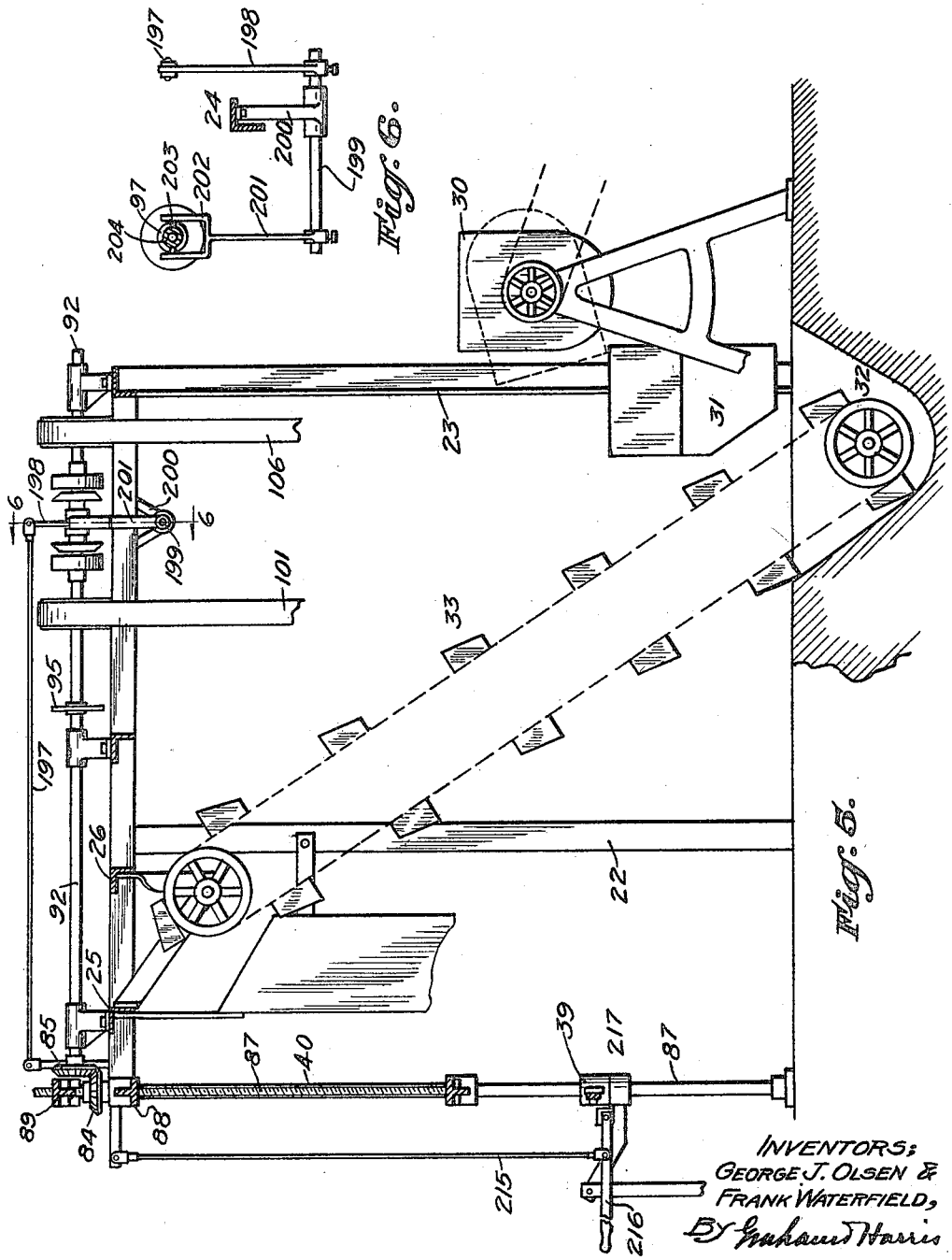

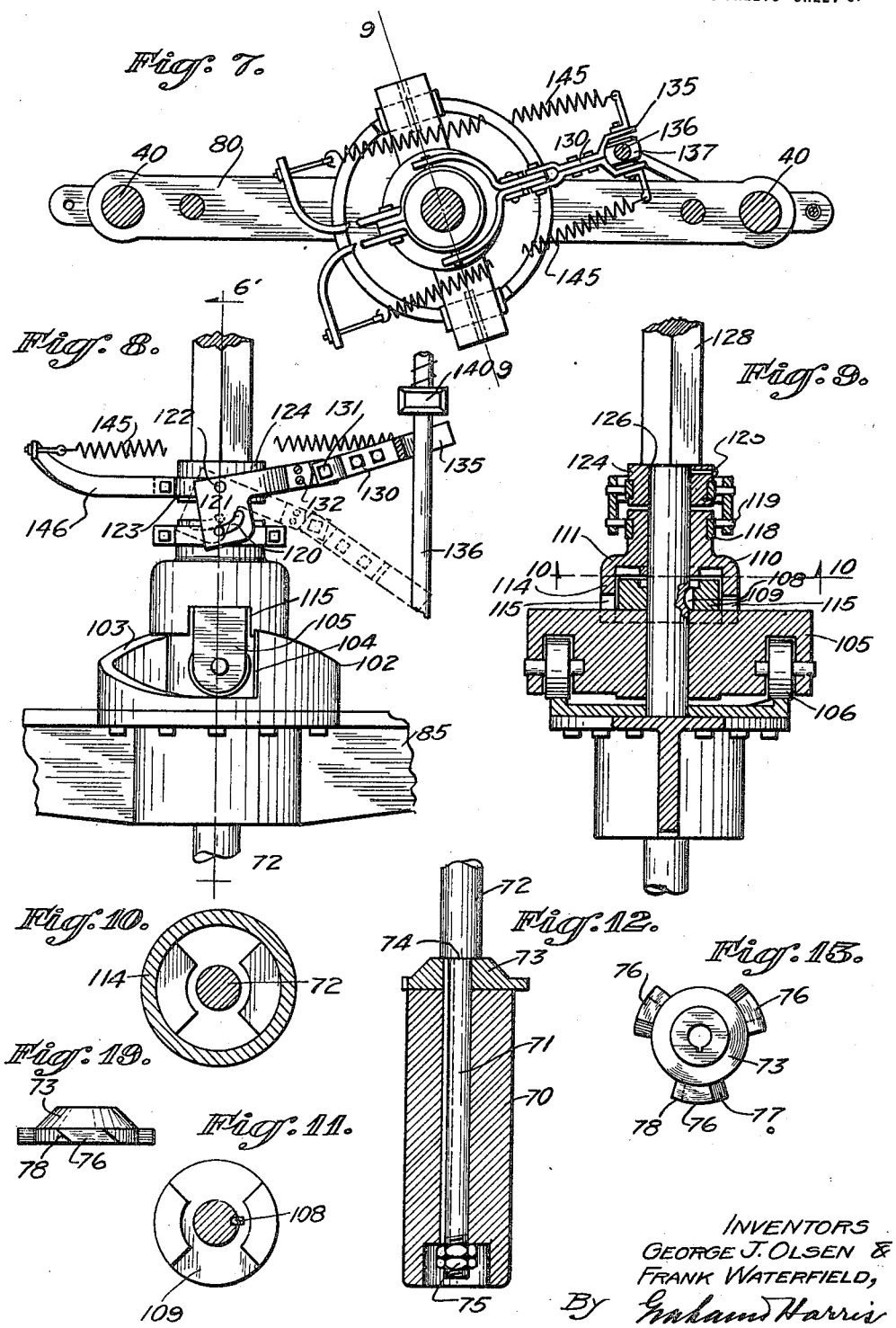

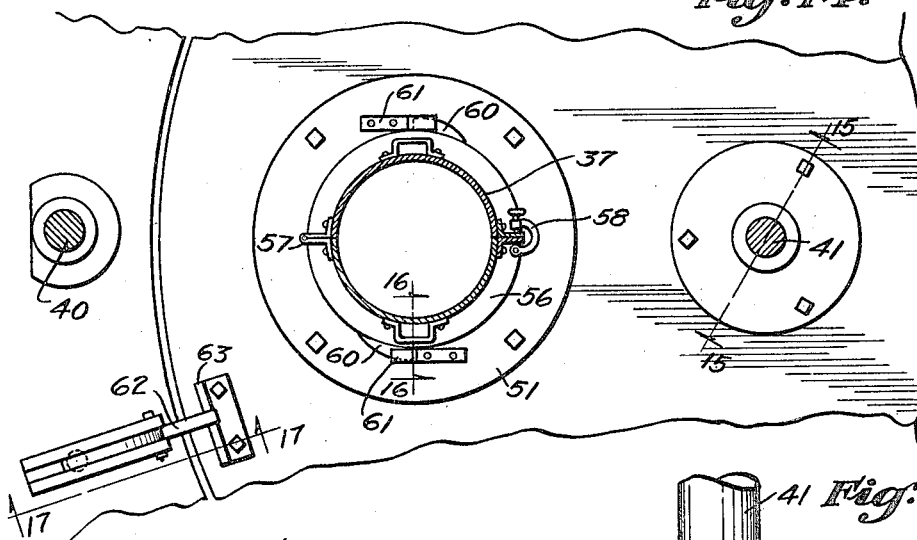

UNITED STATES PATENT OFFICE.

GEORGE J. OLSEN, OF COLTON, AND FRANK WATERFIELD, OF LOS ANGELES, CALIFORNIA, ASSIGNORS TO CALIFORNIA PORTLAND CEMENT COMPANY, A CORPORATION OF CALIFORNIA.

PIPE-MAKING MACHINE.

1,384,021.   Specification of Letters Patent.   Patented July 5, 1921.

Application filed March 1, 1920. Serial No. 362,610.

*To all whom it may concern:*

Be it known that we, GEORGE J. OLSEN and FRANK WATERFIELD, both citizens of the United States, the former residing at Colton, in the county of San Bernardino and State of California, and the latter residing at Los Angeles, in the county of Los Angeles and State of California, have invented a new and useful Pipe-Making Machine, of which the following is a specification.

Our invention relates to the art of making pipe, being more particularly the method and machine for making sections of pipe of cement or other plastic material.

The principal object of our invention is to produce a machine of the character described, of simple form and construction, in which the pipe produced is provided with a glazed finish on the interior of the pipe.

Another object of our invention is to produce a machine of the character described whereby a suspended core is moved vertically through a mold, and during such vertical travel is both reciprocated and revolved, the mechanism for producing such movements being of simple form and construction and arranged above the mold.

Another object of our invention is to produce a machine of the class described in which the core moves upwardly through the mold during the making of the pipe, and means provided for wetting the portion of the core below the mold as it enters the mold.

Other objects and advantages will appear hereinafter from the following description and the drawings.

Referring to the drawings, which are for illustrative purposes only,

Figure 1 is a plan view of a machine embodying a form of our invention.

Fig. 2 is a vertical sectional view on line 2—2, Fig. 1, the parts of the machine being in the position assumed during the making of the pipe section.

Fig. 3 is a view similar to Fig. 1. the parts being shown in the position assumed at the time that the pipe section is finished.

Fig. 4 is an enlarged vertical sectional view of a portion of the controlling mechanism.

Fig. 5 is a fragmentary diagrammatic side elevation of the machine shown in Fig. 1.

Fig. 6 is a transverse sectional view on line 6—6, Fig. 5.

Fig. 7 is an enlarged sectional plan view of the tripping device.

Fig. 8 is a side elevation of the device shown in Fig. 7.

Fig. 9 is a vertical sectional view on line 9—9, Fig. 7.

Fig. 10 is an inverted sectional plan view on line 10—10, Fig. 9.

Fig. 11 is a plan view of the male member of the clutch.

Fig. 12 is a vertical sectional view of the core and packer head.

Fig. 13 is a plan view of the packer head.

Fig. 14 is a plan view of a portion of the turn table, the mold being shown in section thereon.

Fig. 15 is a vertical sectional view on line 15—15, Fig. 14.

Fig. 16 is an enlarged vertical sectional view on line 16—16, Fig. 14 of a lower portion of the mold.

Fig. 17 is a vertical sectional view on line 17—17, Fig. 14, of a portion of the turn table showing the stop therefor.

Fig. 18 is a side elevation, partly in section, of a bell crank lever forming a part of the controlling device, and Fig. 19 is a side view of the packer head.

The machine consists of a frame having posts 22 and 23 which support longitudinal bars 24 connected by cross bars 25, 26, 27 and 28. 30 designates a mixer for the cement, which may be of any common form or construction. the mixer discharging into a chute 31 which delivers the mixed material into a boot 32 from which the material is delivered by an elevator diagrammatically illustrated at 33 into a hopper 34, the hopper 34 discharging into a pan 35. The pan 35 is circular in form, having a flanged central opening 36 of the same inner diameter as the inner diameter of the mold 37. The pan 35 is supported on a cross bar 38 which is secured by means of suitable bolts to guide blocks 39 which are slidably mounted upon standards 40 and 41. 43 designates a base member mounted on the lower end of the standard 41, the base member being formed with a ball race 44 on which is a series of balls 45 which support a circular plate 46. The circular plate in turn supports the central portion of a turn table 47 through the medium of screws 48.

The turn table 47 is provided with a series of openings 50 over each of which is bolted a circular plate 51, the circular plate having a central opening 52 concentric with its respective opening in the table, the opening 52 being of the same diameter as the inside of the pipe to be formed, the opening 52 having a circular flange 53 formed thereon to form the recess in one end of the pipe to receive the opposite end of a similar pipe when the same are finally used.

55 designates a ring which fits over the flange 53 and against which the base 56 of the mold is clamped, the mold 37 being formed in halves as shown in Fig. 14, the halves being hinged as indicated at 57 and any suitable form of locking device used as indicated at 58. This ring 55 closes the lower end of the mold and is clamped between the two halves of the mold.

The base 56 is provided with a pair of lugs 60 which engage under feet 61 on the plate 51 thereby holding the mold in place upon the turn table. The turn table is held in proper relation to the rest of the machinery during the pipe making operation by means of a pivoted dog 62 which engages in a notched bar 63 mounted on the turn table. The turn table 47 is also supported at its outer edge on rollers 66 supported on a circular plate 67.

70 designates the core which is suspended on the lower reduced end 71 of a shaft 72, a packer head 73 being clamped between the shoulder 74 on the shaft and the upper end of the core, nuts 75 being threaded onto the lower end of the shaft to firmly clamp the core and packer head to the shaft 72. The packer head is provided with a series of blades 76, one end of each blade being beveled on the upper side as indicated at 77 and the opposite end of each blade being similarly beveled as indicated at 78 on the under side.

The shaft 72 has three different movements; first, a primary vertical movement; second, a secondary vertical reciprocatory movement; and third, a rotative movement. The primary vertical movement is imparted to the shaft 72 by the following mechanism:

80 designates a cross-head which is slidable vertically on the standards 40, 41. The cross-head 80 has secured thereto the lower ends of screws 81, the upper ends of which extend through a cross-bar 82 and head bar 83. Threaded on each screw 81 is a bevel gear 84 which meshes with a bevel gear 85, one of said gears 85 being fixed to a shaft 86 and the other bevel gear 85 being fixed to the shaft 87. The shaft 87 is driven from the shaft 86 by means of a chain 88 which meshes with sprocket wheels 89 and 90 on the shafts 86 and 87 respectively. The shaft 86 is driven through a clutch member 91 which clutch member is driven in one direction by means of a member 92 or in the opposite direction by a member 93 according to the position of the clutch member 91. The member 92 is secured to a pulley 94 which is driven by a straight belt 95 from a pulley 96 on a drive shaft 97. The member 93 is attached to a pulley 98 which is driven by a cross belt 99 from a pulley 100 secured to the drive shaft 97. The drive shaft 97 is driven from any suitable power source by means of a pulley 101, which pulley is secured to the drive shaft. The operation of the screws 81 through the mechanism just described causes the cross-head 80 to move upwardly or downwardly according to the position of the clutch member 91.

Secured to the cross-head 80 in any suitable manner is a cam 102, circular in form, having inclined faces 103 terminating in abrupt walls or steps 104. Loosely mounted on the shaft 72 above the cam is a follower 105 having wheels 106 which ride upon the cam. Secured to the shaft 72 by means of a key 108 is the male member 109 of the clutch 110, the female member 111 of which is loosely mounted on the shaft 72 above the member 109. The member 111 is provided with a depending circular flange 114 having two recesses 115 which receive the upper portion of the follower 105 and cause the follower to rotate with the shaft when the clutch 110 is in engagement.

The clutch is operated by the following mechanism:

Mounted in a groove in the member 111 is a loose ring 118 having pins 119 projecting outwardly therefrom. These pins extend through cam slots 120 in a yoke 121 pivotally mounted on pins 122 secured to a loose ring 123 mounted in a slot formed in a collar 124 secured to the shaft 72 by means of a screw 125 and abutting against a shoulder 126 formed on the shaft 72, such shaft above the shoulder being square in cross section as indicated at 128. The yoke 121 is operated by means of an arm 130 pivotally connected to the yoke by means of a bolt 131, the pivotal movement of the arm on the yoke being limited by means of stops 132 which are engaged by the end of the arm 130. The outer end of the arm is forked as indicated at 135 to receive a rod 136 upon which is arranged fixed upper and lower collars 137 and 138 respectively. The upper collar 137 supports, by means of a coiled spring 139 attached thereto in any suitable manner, a loose collar 140 and the lower collar 138 supports a loose collar 141 by means of a coiled spring 142. The collars 137 and 140 are flattened on two sides as indicated at 143 to permit the sides of the fork to freely pass such collars but are so arranged as to engage the base of the fork 135 when the arm 130 is in upper or full line position shown in Fig. 8, but which allow the fork to pass when the same is in dotted line position shown in Fig. 8.

The arm 130 is elastically held against the stop 132 by means of coiled springs 145, one end of said springs being secured to the fork 135 and the other ends secured to bars 146 mounted on the ring 123. This construction is such that when the arm 130 is moved over the center as hereinafter described the springs quickly throw the clutch in or out as the case may be. The springs 145 have the further function of holding the clutch either in or out as the arm is held by the springs in either extreme position.

The lower end of the rod 136 is rigidly mounted in a bracket 147 secured to the standard 41, and at its upper end the rod is secured to the cross bar 82. The squared upper end 128 of the shaft 72 extends freely through the cross bar 82 and through a bushing 150 in the head bar 83. Means are provided for rotating the shaft 72 which consists of a bevel gear 151 through which the squared portion of shaft 72 slidably extends, such gear 151 meshing with a bevel gear 152 secured to the end of a shaft 153 driven by means of a sprocket wheel 154 from a chain 155 which chain is driven by a sprocket wheel 156 on shaft 97.

Resting upon the head bar 83 is a weight 160 having a recess 161 arranged to receive the upper end of shaft 72 after the shaft starts its upward movement, during which movement the shaft picks up the weight which compensates for the added friction of the core in the mold after the section of pipe is partially completed. A guide ring 162 is provided for the weight 160 supported on standards 163 mounted on the head bar 83.

Means are provided for lifting the pan 35 from the mold after the section of pipe is completed which consists of the following mechanism. The upper end of the mold is provided with a tapered ring 170 which engages the tapered central opening 171 in the bar 38 when the pan is in lower position. Formed on the blocks 39 of the bar 38 are ears 172 and 173. Secured to the ear 172 by means of nuts 174 is a rod 175 which extends slidably through an ear 176 formed on one end of the cross-head 80. The upper end of the rod 175 is provided with a head 177 which is engaged by the ear 176 in its upward movement thereby lifting the bar 38 and pan thereon. The lifting of one end of the bar 38 by the rod 175 is equalized on the other end of the bar 38 by means of a pipe 178 rigidly fixed at its upper end to an ear 179 on the cross-head by means of nuts 180, such pipe being slidable through the ear 173 on bar 38. The lower end of the pipe 178 is provided with a flange 181 which engages the under side of the ear 173 as the pipe is carried upwardly by the cross-head 80 thereby lifting the bar 38.

Freely movable through the pipe 178 is a rod 185 having an upper stop or collar 186 fixed thereon by means of a set screw 187 which stop 186 is arranged to be engaged by a coiled spring 188 resting on the ear 179 and a lower stop or collar 190 secured thereto by means of a set screw 191, such collar 190 having a coiled spring 192 seated thereon arranged to engage the flange 181 on the pipe as more fully hereinafter described.

The upper end of rod 185 is connected to one arm 194 of a bell crank lever 195 pivotally mounted on the head bar 83. The other arm 196 of the lever 195 is connected by means of a rod 197 with the upper end of an arm 198 fixed at its lower end on a shaft 199 mounted in a bracket 200, which bracket is supported in the frame of the machine. Secured to the shaft 199 is an arm 201 the upper end of which forms a fork 202 having pins 203 engaging in a circular groove 204 in the clutch member 91.

The bell crank lever 195 is elastically held in the position to which it may be moved by means of a rod 206, the lower end of which is beveled to form a blade which seats in a notch 207 formed in a bar 208 fixed to the frame of the machine. The rod 206 slidably extends through a lug 209 on the arm 196 of the bell crank and is provided with a flange or fixed collar 210 which engages one end of a coiled spring 211 on the rod 206, the other end of the spring engaging a loose washer 212 which engages the under side of the lug 209.

The bell crank 195 may be manually operated by means of a rod 215 the lower end of which is connected to a hand lever 216 pivotally mounted on a collar 217 fixed to the standard 40.

The machine operates in the following manner:

Cement from the mixer 30 is delivered through the chute 31 to the elevator 33 which discharges the cement to the hopper 34 into the pan 35. From the pan 35 the cement enters the top of the mold 37. Assuming the parts to be in the position shown in Fig. 2 the pipe is partially finished, the cross-head is moving upwardly through the medium of the screws 81 which are operated as heretofore described. The upward movement of the cross-head 80 carries with it the core shaft 72. During this upward movement of the shaft 72 such shaft is rotated through the medium of the gear 151 driven as heretofore described, and as the parts of the clutch 110 are in engagement, the follower 105 is rotated causing the wheels 106 to travel on the cam 102. The travel of the wheels or rollers on the cam gives a comparatively slow raising movement to the shaft 72 and as the rollers drop over the steps on the cam the shaft and core thereon drop suddenly. The upward rotative movement of the core just described causes the blades on the packer head to draw a portion of the cement in the upper part of the mold downwardly due to the beveled faces on the blades on the packer head and the drop of the core tamps the cement so drawn downwardly into the bottom of the mold. It is to be understood that the wheels do not drop upon the lowest part of the cam from the highest point as the cement under the packer head takes the body of the blow of the packer head.

The continual movement of the core in the pipe as it is being made smoothens or trowels the inner face of the pipe. We have found that by wetting the core as it enters the mold that a much smoother and harder surface can be made on the interior of the pipe, and to accomplish this result a pipe 220 is arranged under the turn table from which a spray of water is directed against the core.

When the pipe has been completed to the top of the mold the arm 130 is moved downwardly by the stop 140, this movement disengaging the clutch 110 and the follower ceases to rotate with the shaft thereby stopping the tamping action of the core. The upward movement of the cross-head and shaft 72 continues however, the pan 35 being lifted free of the mold when the head 177 on rod 175 is engaged by the ear 176 and the flange 181 on the pipe 178 is engaged by ear 173. The upward movement of the cross-head continues until the stop 186 is engaged by the spring 188 thereby moving rod 185 to operate the bell crank 195 which through the medium of rod 197 and mechanism heretofore described operates the clutch to reverse the movement of the shafts 86 and 87 to move the cross-head downwardly. During the upward movement of the parts above described, when the pan has been lifted and the core is free above the mold, the turn table is rotated to bring another mold into place, after which the mold containing the completed pipe is removed, the upper end of the pipe section being troweled by hand before removal from the mold.

The mold 37 is removed from the table by turning the mold to disengage the lugs 60 from the feet 61 after which the mold containing the pipe is lifted free of the flange 53 and moved to any suitable place until the cement is sufficiently set. The mold may then be removed from the pipe by opening the locking device 58 and the two halves of the mold swing apart on the hinges 57.

When the clutch 91 has been shifted to start the core downwardly the downward movement continues until the flange 181 on the pipe 178 strikes the spring 192 which moves the rod downwardly and operates the clutch 91 to start the core upwardly. During this downward movement of shaft 72 and just before reaching its lowest point the arm 130, which during such movement is in the position shown in Fig. 3, strikes the collar or stop 141 which moves such arm upwardly to throw in clutch 110 thereby starting the rotation of the follower 105 on cam 102 which starts the tamping movement of the core as it starts on its upward movement. It is understood that the bar 38 seats itself upon the new mold and the pan is in place as shown in Fig. 2 as the downward movement of the cross-head carries with it the bar 38 until the same is seated on the mold as just described.

The travel of the cross-head upwardly may be stopped at any desired point and the tamping continued by operating hand lever 216 to operate bell crank 195 and throw clutch 97 into neutral position. This permits an extra tamping of the pipe if such may be desirable.

What we claim is:—

1. In a pipe making machine, a mold, a core movable through the mold, and means for lubricating the core as it enters the mold.

2. In a pipe making machine, a mold, a core movable upwardly through the mold, and means for wetting the core below the mold as it enters the mold.

3. In a pipe making machine, a mold, a core movable through the mold with a reciprocating movement, means for rotating the core during such movement, and means for wetting the core as it enters the mold.

4. In a pipe making machine, a mold open at the top and having a core receiving opening in the bottom, a core extending through the opening in the bottom, means for suspending the core in the mold, means for rotating the core and means for reciprocating the core upwardly through the mold.

5. In a pipe making machine, a mold, a shaft terminating in a reduced end forming a shoulder on the shaft, a packer head on the shaft against the shoulder, a core on the shaft against the packer head, and means on the lower end of the shaft for clamping the packer head between the core and said shoulder.

6. In a pipe making machine, a mold, a shaft, a shoulder on the shaft, a core on the shaft, a packer head on the shaft between said core and said shoulder, means for securing the core on said shaft to clamp said packer head against said shoulder, and means for suspending said shaft above the mold.

7. In a pipe making machine, a rotatable table having a plurality of core receiving openings, a mold detachably secured to the table over each such opening, a core suspended above the table arranged to register with one of the openings in the table, and a water pipe extending under said table arranged to direct water against that portion of the core extending below the table.

8. In a pipe making machine, a mold, a core, a shaft extending through said core for suspending the core in the mold, and means for securing a packer head on the shaft above the core.

9. In a pipe making machine, a mold, a core, a shaft extending through said core for suspending the core in the mold provided with a shoulder, a packer head on the shaft above the core in engagement with the shoulder, said packer head having a series of blades thereon extending outwardly beyond the periphery of the core and securing means on said shaft.

10. In a pipe making machine, a mold, a core, a shaft extending through said core for suspending the core in the mold, a shoulder formed on said shaft, a packer head on the shaft above the core engaging said shoulder, said packer head having a series of blades thereon extending outwardly beyond the periphery of the core, each end of said blades having a beveled surface and a nut upon the lower end of said shaft engaging the core arranged to clamp the packing head against said shoulder.

11. In a pipe making machine, a mold, a core suspended in said mold, means for rotating the core in the mold, means for moving the core upwardly through the mold until the core has cleared the mold and means for reciprocating said core during its upward movement.

12. In a pipe making machine, a mold, a core suspended in the mold, a packer head secured to the upper end of the core, means for rotating the core in the mold, means for moving the core upwardly through the mold, and means for vertically reciprocating the core during its upward movement until the packer head is above the mold.

13. In a pipe making machine, a mold, a shaft, a core suspended on the lower end of said shaft, a cross-head supporting said shaft, means for moving said cross-head vertically, means for reciprocating said shaft in said cross-head during its upward movement, and means for rotating said shaft.

14. In a pipe making machine, a mold, a shaft, a core suspended on said shaft, a packer head secured to the shaft at the upper end of the core, vertical standards, a cross-head slidable on said standards, means for supporting the shaft on the cross-head, means for moving the cross-head vertically on said standards, means for rotating said shaft, and means carried by said cross-head for reciprocating said shaft during a portion of its upward movement.

15. In a pipe making machine, a mold, a shaft, a core suspended on said shaft, a packer head secured to the shaft at the upper end of the core, vertical standards, a cross-head slidable on said standards, means for supporting the shaft on the cross-head, means for moving the cross-head vertically on said standards, means for rotating said shaft, and means carried by said cross-head for reciprocating said shaft during a portion of its upward movement, said means consisting of a cam secured to the cross-head, a follower arranged to run on said cam and means for coupling said follower to said shaft.

16. In a pipe making machine, a mold, a shaft, a core suspended on said shaft, a packer head secured to the shaft at the upper end of the core vertical standards, a cross-head slidable on said standards, means for supporting the shaft on the cross-head, means for moving the cross-head vertically on said standards, means for rotating said shaft, means carried by said cross-head for reciprocating said shaft during a portion of its upward movement, said means consisting of a cam secured to the cross-head, a follower arranged to run on said cam and a loose clutch member on said shaft engaging said follower, a tight clutch member fixed to the shaft, and means operated by the vertical movement of said shaft for engaging and disengaging said clutch members.

17. In a pipe making machine, a mold, a shaft, a core suspended on said shaft, a packer head secured to the shaft at the upper end of the core, vertical standards, a cross-head slidable on said standards, means for supporting the shaft on the cross-head, means for moving the cross-head vertically on said standards, means for rotating said shaft, and means carried by said cross-head for reciprocating said shaft during a portion of its upward movement, said means consisting of a cam secured to the cross-head, a follower arranged to run on said cam, and a loose clutch member on said shaft engaging said follower, a tight clutch member fixed to the shaft, and means operated by the vertical movement of said shaft for engaging and disengaging said clutch members, said last named means consisting of a yoke mounted on said shaft arranged to engage and disengage the loose clutch member from the tight clutch member, an arm for operating said yoke, a bar and stops on said bar arranged to engage said arm.

18. In a pipe making machine, a mold, a shaft, a core suspended on said shaft, a packer head secured to the shaft at the upper end of the core, vertical standards, a cross-head slidable on said standards, means for supporting the shaft on the cross-head, means for moving the cross-head vertically on said standards, means for rotating said shaft, a bar slidably mounted on said standards, a pan on said mold supported on said bar, means operated by said cross-head to raise the bar above the mold when the pipe is completed, and means for delivering cement to said pan.

In testimony whereof, the said GEORGE J. OLSEN has hereunto set his hand at Colton, California, this 20th day of February, 1920, and the said FRANK WATERFIELD has hereunto set his hand at Los Angeles, California, this 20th day of February, 1920.

GEORGE J. OLSEN.
FRANK WATERFIELD.